United States Patent
Stephan et al.

(10) Patent No.: US 11,853,273 B1
(45) Date of Patent: Dec. 26, 2023

(54) PARTIAL MIGRATION OF APPLICATIONS ACROSS DATABASE SYSTEMS

(71) Applicant: Amazon Technologies, Inc., Seattle, WA (US)

(72) Inventors: Roy Edward Stephan, Dunn Loring, VA (US); Benjamin Snively, Orlando, FL (US); John MacDonald Winford, Vancouver (CA); John Calhoun, Herndon, VA (US); Nathan McGuirt, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 16/145,093

(22) Filed: Sep. 27, 2018

(51) Int. Cl.
*G06F 16/24* (2019.01)
*G06F 16/21* (2019.01)
*G06N 20/00* (2019.01)
*G06F 16/25* (2019.01)
*G06F 16/2452* (2019.01)
*G06F 16/2455* (2019.01)
*H04L 67/56* (2022.01)

(52) U.S. Cl.
CPC ........ *G06F 16/214* (2019.01); *G06F 16/2452* (2019.01); *G06F 16/2455* (2019.01); *G06F 16/252* (2019.01); *G06N 20/00* (2019.01); *H04L 67/56* (2022.05)

(58) Field of Classification Search
CPC .. G06F 16/214; G06F 16/252; G06F 16/2455; G06F 16/2452; G06F 16/20; G06F 16/24; G06N 20/00; H04L 67/28

USPC .......................................... 707/609
See application file for complete search history.

(56) References Cited

U.S. PATENT DOCUMENTS

| | | | |
|---|---|---|---|
| 8,601,220 B1 | 12/2013 | Corbin et al. | |
| 2012/0166483 A1* | 6/2012 | Choudhary | G06F 16/2471 707/E17.014 |
| 2013/0091285 A1* | 4/2013 | Devarakonda | G06F 9/4856 709/226 |
| 2015/0200833 A1* | 7/2015 | Cutforth | G06F 3/067 709/224 |

* cited by examiner

*Primary Examiner* — Hosain T Alam
*Assistant Examiner* — Tracy M McGhee
(74) *Attorney, Agent, or Firm* — Robert C. Kowert; Kowert, Hood, Munyon, Rankin & Goetzel, P.C.

(57) ABSTRACT

Systems and methods are provided to enable a partial migration of applications from one database system to another without modifying the applications. In embodiments, a proxy server is configured to monitor the application's usage of a current database, and generate a migration plan to partially migrate database objects used by the application to a different type of database. An object may be selected for migration based on its usage level or its portability. After the partial migration, the proxy server may remain in place as a request router to route the application's requests to the two databases. In embodiments, the migration system may forward queries to both databases and compare the query results received from the two. Based on the comparison results, the migration system may programmatically determine adjustments to its query handling configuration settings.

23 Claims, 12 Drawing Sheets

Migration Plan 240

| Object 242 | Request types 244 | Reads/Writes 245 | Row count 246 | Portability 247 | Recommendation 248 |
|---|---|---|---|---|---|
| Table A | Read request X<br>Write request Y | 5000 / 100 | 5000 | Yes | Migrate |
| Table B | Read request X<br>Write request Z | 5000 / 200 | 2000 | Yes | Migrate |
| Table C | Write request Y | 0 / 100 | 29000 | Yes | Migrate (with data feed refresh) |
| Stored Proc S | Read request X | 5000 / 0 | N/A | No | Migrate manually |
| Trigger T | Write request Y | 0 / 100 | N/A | No | Do not migrate |

Configure migration for Table B:

Current status: Not Migrated

Migration recommendation: Auto    Migrate request types: Read, Write

Migrate columns: All    Ongoing data feed: No

Migrate rows: All

Configure 250

Generate destination object code 260

Create destination object 262

Generate object population code 270

Populate destination object 272

*FIG. 2B*

PARTIAL MIGRATION OF APPLICATIONS ACROSS DATABASE SYSTEMS

BACKGROUND

Recent advances in virtualization technologies have increased the reliability, scalability, and cost efficiency of cloud computing. Cloud-based database services, in particular, have enabled consumers to flexibly structure their computing and storage costs in response to immediately perceived computing and storage needs. To transition computing systems to the cloud, owners of production applications must sometimes migrate the applications from legacy databases to newer databases in the cloud. However, such migrations are not straightforward because the applications may rely on a large set objects in the legacy database, which may implement sophisticated database functionality that is not easily portable to the new database. Despite careful testing, migration of an application between databases often entails substantial amounts of risk for the application owner. For example, subtle differences in database behavior may go unnoticed until after the migration has been completed. These differences may sometimes cause severe problems in the migrated application. Moreover, in some cases, an application being migrated cannot be easily modified (e.g., because the original source code or development team is no longer available). Accordingly, the new database system must continue to provide the database interface of the legacy database. These problems complicate the migration of large applications, making such processes expensive, time-intensive, and highly error-prone.

BRIEF DESCRIPTION OF THE DRAWINGS

FIGS. 2A and 2B illustrate an example set of database requests used by an application and an example migration plan generated by an application migration management system, according to some embodiments.

Figure 1:
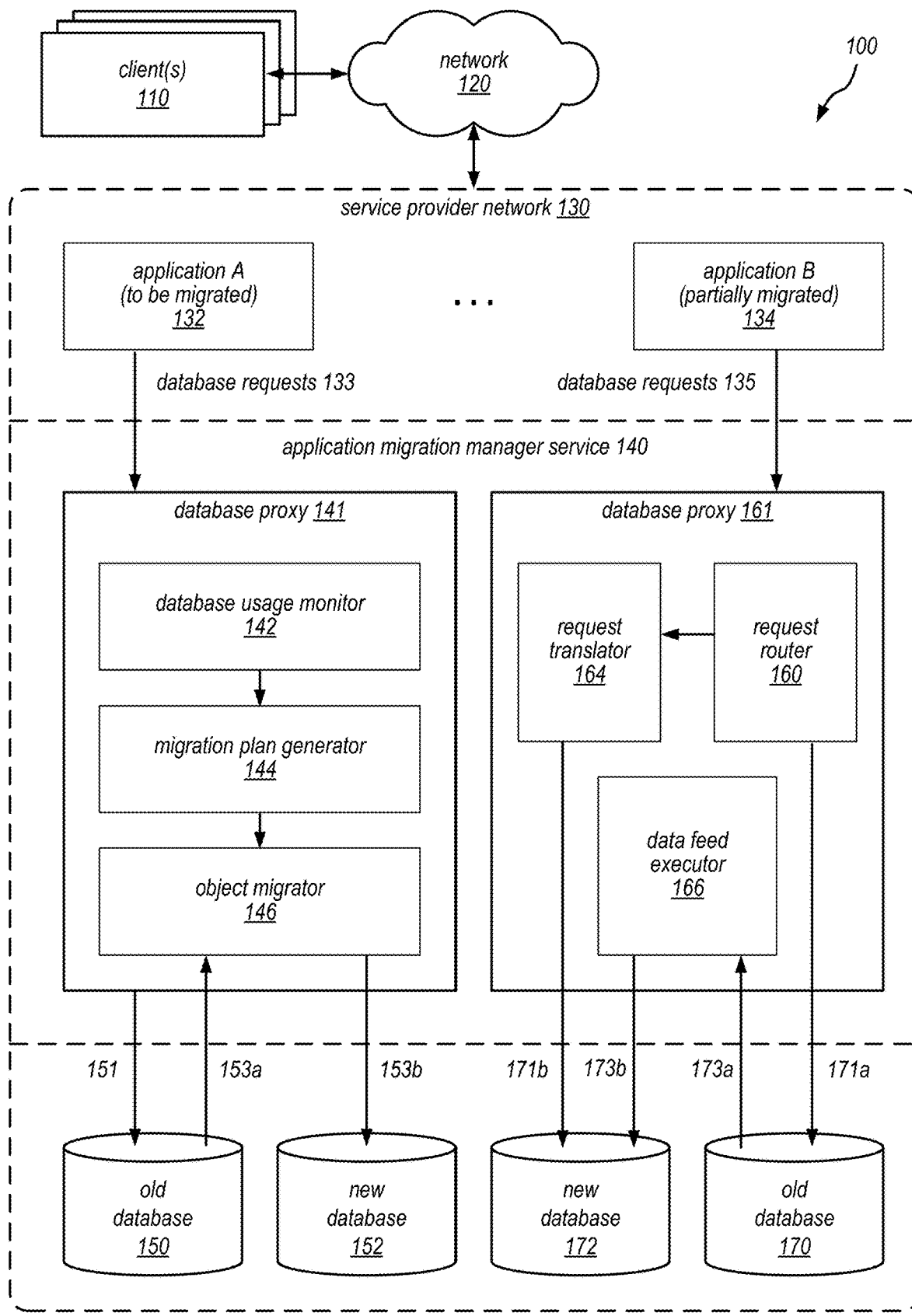
FIG. 1 is a block diagram illustrating an example application migration management system that migrates applications to different database systems without modifying the application, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement an application migration management system to migrate applications to different database systems without modifying the application. In some embodiments, a proxy server is configured to monitor an application's usage of a current database, and generate a migration plan to partially migrate database objects used by the application based on observed usage data. A database object may be a unit of the database that can be independently migrated. Depending on the type of database, a database object may be a table, a view, an index, a stored procedure, a trigger, or a variety of other types of objects supported by the database. A database object may be selected for a partial migration of the application based on a number of factors, such as its usage level or its portability. In some embodiments, after the migration, the proxy server may remain in place as a request router to route application's requests to the two databases and a request translator for the new database. In some embodiments, the system may implement a test process for the migrated application, wherein the queries from the application are forwarded to both databases and the query results are compared. Based on the comparison results, the system may programmatically decide to make configuration adjustments, for example, to switch over to the new database for certain types of database requests, or fall back to the old database for certain other types of database requests.

Applications that run on one type of legacy database system may sometimes be migrated to another type of database system. For example, in some cases, application migrations may be performed to transition these applications into cloud-based service provider networks. However, application migrations are not typically straightforward because the applications rely on a large set database objects in the legacy database, which may implement sophisticated database functionality that is not easily portable to the new database. Accordingly, migration of large applications often entails substantial amounts of risk for the application owner. Moreover, in some cases, an application being migrated cannot be easily modified (e.g., because the original source code or development team is no longer available). The new database solution must thus continue to provide the database interface of the legacy database. These problems complicate the task of migrating large applications, making such processes expensive, time-intensive, and highly error-prone.

Accordingly, embodiments of an application migration management system are disclosed herein to migrates applications to different database systems without the need to modify the applications. In some embodiments, the application's usage of a first database (e.g., the legacy database) is observed for a period of time. In some embodiments, a proxy server may be used to observe the application's database requests and store its observations as part of the application's usage data. The usage data may indicate, for example, the different types of database requests that are generated by the application, the volume or frequency of different request types, and the database objects that are used by each request type. In some embodiments, the usage data may also include data from other sources, such as the database itself or a transaction log maintained by the database. For example, the proxy server may determine the size (e.g. item count or data size) of a table used by the application. As another example, the proxy server may analyze the transaction logs of a database to determine a table that is updated via a database trigger. Such triggered updates may be implemented in embedded database code and not be easily detectable from just the database request alone.

In some embodiments, the application migration management system may generate a migration plan for the application based on the collected usage data. In some embodiments, the migration plan may specify a partial migration that only migrates some subset of the database objects used by the application. In some embodiments, the selection of objects to be migrated is performed according to a selection policy. In some embodiments, the selection process may be based on a number of factors, such as a usage level of an object by the application (e.g., the number of requests hitting the object or size of the object), or a portability indicator, indicating whether the object can be easily implemented in the new database system (e.g., without human intervention). In some embodiments, the system may recommend that complex objects such as stored procedures or database triggers be migrated manually.

In some embodiments, after the application is partially migrated, the proxy server may remain in place to act as a request router the application. In some embodiments, the proxy server may present a database interface of the legacy database, and forward some of the application's requests to the legacy database and some to the new database. In addition, the proxy server may also serve as a request translator for the new database. By using the proxy server approach, the application does not need to be modified at all. The application may simply continue to issue its database requests as before. Indeed, for some applications, the migration process may not require an actual examination of the application code. This migration approach thus vastly simplifies the application migration process, at least for a portion of the application.

In some embodiments, the proxy server allows the application to continue to operate over both databases for some time without being fully migrated to the new database. However, by offloading at least some of the request traffic from the old database to the new database, some of resources used by the old database may be retired, thereby reducing the application's reliance on the old database and improving the usage efficiency of the application. In some embodiments, manual efforts may be used to gradually migrate other parts of the application to the new database in piecemeal fashion, without impacting the operation of the application.

In some embodiments, as the application is migrated to the new database, different types of requests may be observed during a testing period. For example, in some embodiments, queries from the application may undergo a test period, where each received query is forward to both databases. The query results from the two databases may be compared to determine how closely query results from the new database matches the results from the old database. In some embodiments, if the results match to a sufficient degree, the query is deemed to have passed to test, and all further traffic from queries of that type may be forwarded only to the new database. In some embodiments, if the query results from the two databases fail to sufficiently match, the queries may be reverted back to the old database. Such testing allows the migration system to automatically detect hidden problems caused by the migration process and take corrective actions before the problems are manifested in the application.

In some embodiments, the proxy server may implement a machine learning process to learn the correct query results for different types of queries. In some embodiments, a machine learning model may be used to automatically predict certain differences between the query results from the two databases. In some embodiments, these predicted differences may be eliminated by applying prescribed transformations on queries forwarded to the new database or query results received from the new database. Over time, the combination of the machine learning model and the corrective transformations teaches the proxy server accurately mimic the response behavior of the old database. Advantageously, this process may be performed without analyzing database code in the legacy database or replicating database objects from the legacy database.

As may be understood, the application migration management system described herein may be used to automate and simplify application migration processes for large, complex applications. The migration process does not require the application to be recoded. In some embodiments, the migration process does not require a detailed analysis of the application code. In some embodiments, migration process can be performed gradually, in a piecemeal fashion, so as to avoid the substantial risks associated with a full switchover. In some embodiments, the gradual migration process may be performed in accordance with a testing schedule of the application. For example, an application may be partially migrated for a first set of database objects, and application features that rely on the first set of database objects may be tested. The application may then be partially migrated for a second set of database objects, and features that rely on the second set of objects may be tested. In this manner, the application may be migrated on a feature-by-feature basis to facilitate application testing. In some embodiments, the application migration management system may be used by or incorporated into a large software testing system, and used to upgrade different software to new databases. In some embodiments, individual migrated request types may be automatically tested to ensure that their results match the expected results of the old database. In some embodiments, the proxy server may be left in place to provide a request routing and translation interface that for the new database. In some embodiments, the system may additionally provide a layer of machine learned transformations to replicate the behavior of the old database. These and other features and benefits of the inventive system and method are described in further detail below, in connections with the figures.

FIG. 1 is a block diagram illustrating an example application migration management system that migrates applications to different database systems without modifying the application, according to some embodiments. As shown, in some embodiments, the system 100 may include one or more clients 110, which communicates with a service provider network 130 over a network 120. In some embodiments, an application migration manager service 140 may be implemented within the service provider network 130.

The service provider network 130 may provide computing resources via one or more computing services to the client(s) 110. The service provider network 130 may be operated by an entity to provide one or more services, such as various types of cloud-based computing or storage services, accessible via the Internet and/or other networks to client(s) 110. In some embodiments, the service provider network 130 may implement a web server, for example hosting an e-commerce website. Service provider network 130 may include numerous data centers hosting various resource pools, such as collections of physical and/or virtualized computer servers, storage devices, networking equipment and the like, needed to implement and distribute the infrastructure and services offered by the service provider network 130. In some embodiments, service provider network 130 may employ computing resources for its provided services. These computing resources may in some embodiments be offered to client(s) 110 in units called "instances," such as virtual compute instances.

The client(s) 110 may encompass any type of client configurable to submit requests to the service provider network 130. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 110 may be configured to generate network-based services requests according to a Representational State Transfer (REST)-style network-based services architecture, a document- or message-based network-based services architecture, or another suitable network-based services architecture. In some embodiments, the service provider network 130 may offer its services as web services, and the client(s) 110 may invoke the web services via published interfaces for the web services. In some embodiments, a client 110 (e.g., a computational client) may be configured to provide access to a computing service 130 in a manner that is transparent to applications implemented on the client(s) 110 utilizing computational resources provided by the service provider network 130.

The client(s) 110 may convey network-based services requests to the service provider network 130 via network 120. In various embodiments, network 120 may encompass any suitable combination of networking hardware and protocols necessary to establish network-based communications between clients 110 and service provider network 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the service provider network 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network 130. In some embodiments, client (s) 110 may communicate with service provider network 130 using a private network rather than the public Internet.

In some embodiments, the service provider network 130 may provide a database service or a data warehouse service, which are supported by database systems hosted in the service provider network (e.g., databases 150, 152, 170, 172). In some embodiments, the clients 110 may be the applications that are being migrated across the databases. In some embodiments, the service provider network 130 may host a number of different applications, such as application A1 132 and application A2 134, as shown, and these may be the applications that are being migrated. In some embodiments, application A 132 may be running outside of the service provider network 130. In some embodiments, the old database 150 or the new database 152 may be running outside of the service provider network 130.

In some embodiments, the application migration manager 140 may be implemented as a configurable service of the service provider network. As discussed, in some embodiments, these systems or services may be hosted on instances of virtual machines, which are hosted on physical hosts in the service provider network 130. In some embodiments, many server nodes may be combined into a cluster, which may be used to support a distributed database system, application, or application migration manager. In some embodiments, individual server nodes may be added or removed to these systems or services on-demand, or automatically depending on a scaling policy. In this manner, these systems or services may be automatically scaled. In some embodiments, the application migration manager 140 may be implemented on a client-addressable server or appliance. For example, in some embodiments, the application migration manager 140 may be presented to the application as just another database instance, which is able to accept database connections just like the legacy database.

As shown, in this example, application A 132 is an application to be migrated. Prior to the migration, application A runs on top of the old database 150. In this example, the application migration manager service 140 employs a database proxy 141 to migrate application A from the old database 150 to the new database 152. In some embodiments, database proxy 141 may be a proxy server. In some embodiments, the proxy server may be implemented as one or more virtual machine instances within the service provider network. In some embodiments, the database proxy may present to application A the same database interface as the old database 150. For example, application A may connect to the database proxy 141 using a type of database connection that is the same as what may be used for database 150. Accordingly, database proxy 141 may appear to application A as the old database 150, and the functionalities of the database proxy 141 may be performed transparently, without any changes to or awareness by application A.

As shown, to initially migrate the application A 132, database proxy 141 may employ a database usage monitor 142, a migration plan generator 144, and an object migrator 146. In some embodiments, the database usage monitor 142 may be tasked with monitoring or collecting usage data indicating how application A is using the old database. In some embodiments, the database proxy 141 may be implemented on one or more proxy servers, which may intercept database requests 133 from the application 132, and then forward 151 these requests to the old database 150. In some embodiments, the proxy servers may be used to implement another primary function for the old database, for example, a request router, a load balancer, a database cache subsystem, or the like. In such embodiments, the functionality of the database usage monitor 142 may be added onto these subsystems.

In some embodiments, the database usage monitor 142 may observe the database requests 133 from the application 132, and record certain usage data or metrics for the requests. In some embodiments, such usage data may indicate the types of database requests issued by the application 132. In some embodiments, the usage data may indicate, for individual request types, whether the request is a read or write request, the different database objects (e.g., tables) used by the request, and the volume or frequency of the request issued by the application.

In some embodiments, the database usage monitor 142 may also obtain usage information from the old database 150. Such usage information may include information that are not available from the database requests 133. For example, in some embodiments, the usage information 141 may indicate, the size (e.g., row count or data size) of different objects in the old database. In some embodiments, the usage information may be obtained from object metadata in the old database 150. In some embodiments, the usage data may also indicate different other objects that are affected by the database requests 133. For example, in some embodiments, the old database 150 may employ database triggers, so that an update request to one table will trigger updates to a number of other tables. Such triggered updates may not be observable from the database request 133. Thus, in some embodiments, the database usage monitor 142 may examine the transaction log or some other source of information to determine this sort of usage information.

In some embodiments, after a period of observation, the database usage monitor 142 may provide the usage data to a migration plan generator 144. In some embodiments, the migration plan generator 144 may generate a migration plan to migration the application 132 from the old database 150 to the new database 152. In some embodiments, the migration plan may specify a partial migration. For example, in some embodiments, the migration plan may specify that only a subset of database objects used by application 132 are to be migrated. In some embodiments, only a subset of columns or attributes of certain database objects are included in the migration. In some embodiments, only a subset of rows or items of certain database objects are included in the migration. In some embodiments, a database object may be migrated only for certain types of database requests (e.g., read requests), while other types of database requests are to be serviced by the old database 150. In some embodiments, the migration plan generator 144 may generate a migration plan that includes recommendations to a client, which may be approved or modified by the client. In some embodiments, the migration plan generator 144 may generate multiple successive migration plans, to progressively or gradually migrate database objects used by the application 132 to the new database 152 in stages.

In some embodiments, the database objects or object attributes may be selected to be included in the migration based on a number of factors. In some embodiments, one factor may be a usage level or usage metric of the object determined based on the usage data collected by the database usage monitor 142. In some embodiments, depending on the policy of the migration system, database objects with higher usage may be given priority, because migrating these objects will produce the most benefits for the old database in terms of reduce resource burdens. In some embodiments, database objects with lower usage may be given priority, because such objects present less migration risk.

In some embodiments, the selection may also depend on a portability of the database object. The portability of a database object may indicate a degree of difficulty that is involved in implementing an object in the new database 152. In some embodiments, an object may be readily portable via an automatically generated mapping of attributes. In some embodiments, the migration plan generator 144 may be able to automatically generate code to create a corresponding destination object in the new database. In some embodiments, some objects may not be easily migratable. For example, some objects may include attributes (e.g., certain types of large binary object attributes) that are not supported in the new database. In some embodiments, complex objects such as materialized views, indexes, stored procedures, or triggers, may not be supported in the new database. In some embodiments, such portability information may be assigned to the objects in the new database via a set of rules provided to the migration plan generator 144. In some embodiments, the migration plan generator 144 may provide a recommendation as to the migration of a certain object, without generating code for the migration. For example, in some embodiments, the usage data may indicate that a database trigger can be implemented via another means in the new database 152, and include the recommendation in the migration plan.

In some embodiments, the selection of objects for the partial migration may depend on which database requests from the application 132 use the objects. For example, in some embodiments, certain high priority requests from the application are to be prioritized for migration. Accordingly, the migration plan may indicate that all database objects used by these high priority requests are to be included in the migration plan.

As shown, in some embodiments, the database proxy 141 may implement an object migrator 146, which may be tasks with performing some of the migration steps in the migration process. As shown, the object migrator 146 may receive the migration plan from the migration plan generator, and carry out portions of the migration plan programmatically. In some embodiments, the object migrator 146 may perform the migration on an object-by-object basis. In some embodiments, the object migrator 146 may generate code to implement or create a destination object in the new database for each object to be migrated. In some embodiments, the object migrator 146 may also generate code to read data 153*a* from a source object in the old database and write data 153*b* to a destination object in the new database. In some embodiments, such generate code may be reviewed and edited by a user. In some embodiments, manually written code may be submitted to the migrator 146 and incorporated into the migration process. In some embodiments, the migration may be performed in manually controllable steps, which may be started, stopped, and monitored. In some embodiments, the migration (or individual migration steps) may be scheduled to be performed at a specified time. In some embodiments, the migration process may be performed to build a partial database for the application in the new database system without stopping the application 132.

As shown, application B 134 is a partially migrated application that is running on top of another database proxy 161. In some embodiments, the database proxy 161 may be responsible for both the initial migration of an application (e.g. application A 132) and also supporting the operations of a partially migrated application (e.g. application B 134). In some embodiments, the database proxy 161 may expose a database interface to application B that is the same as the database interface of the old database 170. For example, the proxy 161 may allow application B to connect to it using a database connection that can be used for the old database. Accordingly, application B may operate over the proxy 161 obliviously and in the same way that it would over the old database 170. In some embodiments, the database proxy 161 may remain in place with the application permanently, in order to serve as a translator of the application's database requests (e.g. requests 135) to the new database. In some embodiments, the initial migration and the continuing support of a partially migrated application may be performed on separate servers. In some embodiments, as discussed, the database proxies may be implemented using a fleet of server nodes, which may be individually assigned to different applications and/or databases.

In this example, as shown, the application B 134 has been partially migrated from old database 170 to new database 172. The partial migration may be performed, for example, in similar fashion as discussed for application A 132. As shown, to support the continuing operation of application B, the database proxy 161 implements a number of components including a request router 160, a request translator 164, and a data feed executor 166.

In some embodiments, the request router 160 may receive database requests 135 from the application 134, and route the requests according to a set of configuration settings for the application. In some embodiments, the configuration settings may be generated at least in part by the migration plan generator 144. In some embodiments, the configuration settings may be configurable by a human administrator, or programmatically via a validation policy. In some embodiments, certain types of database requests 135 may be routed 171*a* to the old database 170, for example, because the database objects required by the requests only exist in the old database. In some embodiments, certain types of database requests 135 may be routed 171*b* to the new database 172, because the database objects required by the requests exist in the new database. In some embodiments, for a particular database object, read requests may be directed to the new database 172 and write requests may be directed to the old database 170. In some embodiments, a database requests (for example a query) may be directed to both databases, for example to test the query handling functionality in the new database.

In some embodiments, the request translator 164 may be implemented to translate requests forwarded to the new database 172. As may be understood, received database requests 135 may be received in a format or protocol that is intended for the old database 170. In this way, the application 134, which was originally designed to run on the old database 170, does not have to be changed to run on the new database 172. For example, the request translator 164 may automatically change requests in one structured language query (SQL) format to another SQL format that is compatible with the new database. As another example, the translator 164 may translate SQL queries to read request for a NoSQL or non-relational database. For example, the translator 164 may receive as input strings representing SQL queries destined for the old relational database, and generate as output objects in a JavaScript Objection Notation (JSON) (or some other format) representing "get item" requests to a NoSQL database, in accordance with the NoSQL database's access interface. Similarly, the translator 164 may receive insert statements in SQL and translate these statements to "put item" requests to the NoSQL database. Depending on the embodiment and the databases involved, the translation may also occur in the reverse direction (e.g., from NoSQL database requests to SQL database requests).

In some embodiments, each of the database requests issued by application 134 may be translated according to a translation function. In some embodiments, the translation function may be generated programmatically during the migration process. In some embodiments, the translation function may be manually specified or modified by a user. In some embodiments, the translation behavior of the database proxy may be dependent on conditions detected by the database proxy 161. For example, as discussed in further detail below, in some embodiments, the database proxy 161 may employ machine learning to update its query handling behavior over time. In some embodiments, the translation behavior of the database proxy 161 may employ both a translation function, which may be static, and also a machine learning component, which may be used to dynamically adjust certain aspects of the translation behavior based on observed inputs or conditions. For example, the translation function and the machine learning component may operate in series or in parallel to translate incoming database requests. In some embodiments, the machine learning component may be an independently configurable component of the translator 164 for different types of database requests, and may be completely optional for certain types of requests.

In some embodiments, the data feed executor 166 may be implemented to execute one or more data feeds to read data 173*a* from the old database 170 and write the data 173*b* to the new database 172. In some embodiments, these data feeds may be specified in the migration plan. For example, in some embodiments, an object in the old database 170 may have been migrated to the new database 172 for read requests only, but not write requests. In this situation, a data feed may be created and periodically executed by the data feed executor 166 to refresh or synchronize the destination object in the new database with changes to the object from the old database. In some embodiments, data feeds may be used to perform the synchronization in the opposite direction (i.e., from the new database to the old database). In some embodiments, the synchronization may be performed from one object to another (e.g., from one table in the old database to another table in the new database). In some embodiments, the synchronization may be implemented using other objects provided by the databases, for example, by reading from a transaction log or update stream generated by the source database, or by writing to a transaction log or write stream that is used to populate the destination database. In some embodiments, code for an ongoing data feed may be generated as part of the migration plan. In some embodiments, certain operational aspects of the data feed executor 166 may be specified by the configuration settings of the database proxy 161. For example, in some embodiments, the configuration settings may specify how often and when the data feed executor 166 will be executed for particular objects in the new database.

Figure 2A:
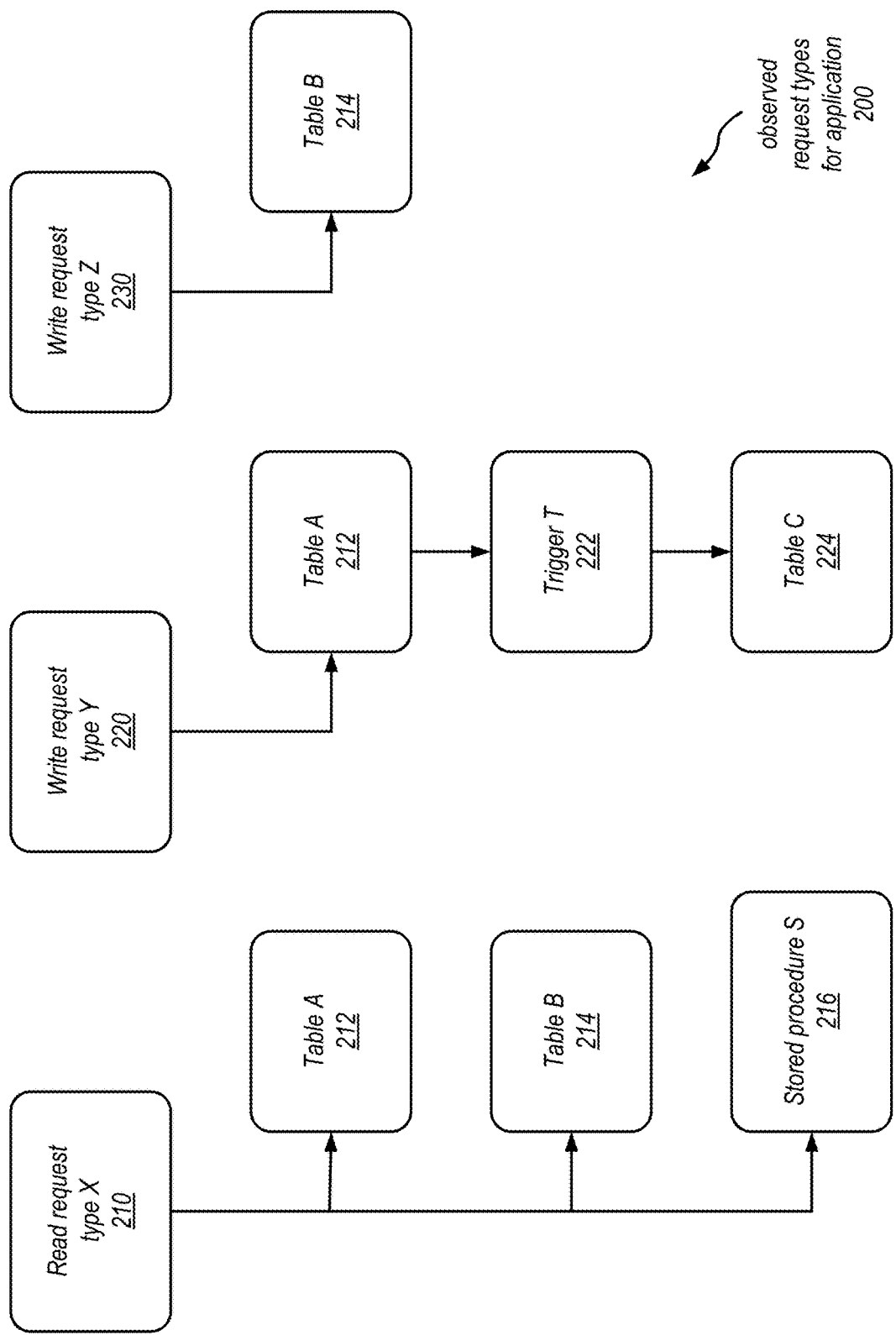

FIGS. 2A and 2B illustrate an example set of database requests used by an application and an example migration plan generated by an application migration management system, according to some embodiments.

As shown, FIG. 2A depicts three request types observed for an application, read request type X 210, write request type Y 220, and write request type Z 230. The application may be, for example, application A 132 as discussed in connection with FIG. 1. As discussed, in some embodiments, a database proxy may observe database requests from an application to determine the application's usage data of the legacy database. The request types shown here may be determined from requests observed from the application. In some embodiments, each request type may be a type of SQL statement. For example, read request type X 210 may be a type of select statement generated from the application, and write request types Y and Z may be two types of insert statements generated from the application.

As shown, each request type may refer to or use a number of different database objects. In the figure, read request type X uses table A 212, table B 214, and a stored procedure S 216. For example, the request type X may correspond to a select statement that joins tables A and B, and explicitly calls the stored procedure S to generate a select attribute. As shown, write request type Y uses table A 212, a trigger T 222, and a table C 224. For example, the write request of type Y may insert a row into table A, which in turn invokes trigger T to insert another row into table C. In some embodiments, the impact of the request type Y on trigger T and table C may be not readily apparent from the database request alone. However, in some embodiments, database proxy may collect usage data from multiple sources (e.g., the metadata of table A or the translation log of the database) in order to identify impacted objects such as trigger T 222 and table C 224. As shown, write request type Z only uses table B 214.

FIG. 2B depicts a migration plan 240 that may be generated from the request types seen in FIG. 2A. As discussed, the in some embodiments, the database proxy may gather usage data for the application, which are used to generate the migration plan. In some embodiments, as shown, the migration plan may be displayed in a graphical user interface (GUI). In some embodiments, the graphical user interface may allow a user or administrator to see a migration recommendation 248 for each object in the database.

As shown, in the depicted GUI shows a table on the top portion, which includes a row for each object used by the application in the legacy database. The table also includes, in different columns or fields, different types of information that influenced its recommendation decision, shown at fields 248.

As shown, field 244 indicates which observed request types used the object. In some embodiments, the database proxy may prefer to migrate all objects impacted by an individual request as a group, so that entire request types can be migrated to the new database. As shown, in this example, all objects associated with read request type X are to be migrated, so that after the partial migration, read request type X can be issued to the new database.

As shown, fields 245 and 246 indicate different types of usage data for the objects. Field 245 indicates the read and write request count for each object observed during the observation period. Field 246 indicates the row count in each object. In some embodiments, objects with high usage levels may be given priority in the migration plan.

As shown, field 247 indicates a portability of each database object. In some embodiments, this indicator may be determined from a set of migration rules configured for the database proxy. In some embodiments, the portability indicator may indicate yes when code to create a destination object in the new database can be automatically generated. In some embodiments, a database object may still be indicated for migration, even when it is not readily portable to the new database (for example, stored procedure S). In some embodiments, the migration plan may indicate an instruction to manually migrate the object. For example, the GUI may allow a user to manually upload a code module that implements the stored procedure S in the new database.

As shown, in this example, the migration plan generator recommends the migration of tables A, B, and C, and the stored procedure S. However, as shown, the table C is migrated with a data feed refresh. This may be indicated because in the legacy database, table C is update by a trigger, which is difficult to port to the new database. As shown, the trigger T is not indicated for migration. Without trigger T, table C may not be properly updated in the new database. Thus, it may be easier to simply refresh table C in the new database from the master version of table C in the legacy database. The functionality to properly update table C may be implemented at a later stage, for example, via another migration plan that implements trigger T in the new database.

As shown, the example GUI also includes a lower portion that indicates different migration configuration settings for a particular selected object in the table. In this example, table B is selected. As shown, the current migration status of table B is not migrated. The current migration recommendation is to "auto," which indicates that a destination object can be created and populated via code that is automatically generated by the migration management system. The settings further indicate that for the migration of table B, all columns and all rows are to be implemented in the new database, and both read and write type requests for table B are to be routed to the new database. Finally, the configuration settings indicate that no ongoing data feed is to be used for table B. For some objects, an ongoing data feed may be implemented in order to synchronize the state of the destination object with its counterpart in the old database. As shown in this example, Table C is to be refreshed with an ongoing data feed. In some embodiments, some or all of these configuration settings may be advisory. For example, some or all of these settings may be changed manually via the configure button 250.

As shown, the bottom portion of the GUI also includes a number of additional buttons. In this example, these buttons may be used to manually perform migration steps for the migration of table B. In some embodiments, a migration step may be performed manually so that an administrator or user can observe the migration of individual objects to as to correct any that migration errors. In some embodiments, the migration process may be carried out automatically according to a specified schedule, for example, at a time at night when the application is not expected to be active.

As shown, button 260 allows a user to generate and see the code to create the destination object for table B in the new database. In some embodiments, the user may be permitted to modify and save the generated code. In some embodiments, along with the destination object creation code, the migration plan generator may also generate one or more translation functions to translate requests directed table B into requests directed to the destination table in the new database. As shown, button 262 may execute the destination object creation code in the new database to create the destination object for table B.

As shown, button 270 may be used to generate object population code to populate the destination object with data from table B. In some embodiments, the process may be performed by dumping the data of table B into an intermediate form outside of the legacy database, and then loading the intermediate form into the new database. In some embodiments, the population process may directly load the destination object via an in-memory transfer. As with the destination object creation code, in some embodiments, the object population code may be edited and stored by the user. As shown, button 272 may initiate the populate process for the destination object in the new database. In some embodiments, this may be a long running process which may be started and paused by the user. In some embodiments, the GUI may allow the user to track the process of the population process. In this manner, the application migration management system may make recommendations to the user for a partial migration of the application, and at the same time allow the user to have control over the migration process.

Figure 3:
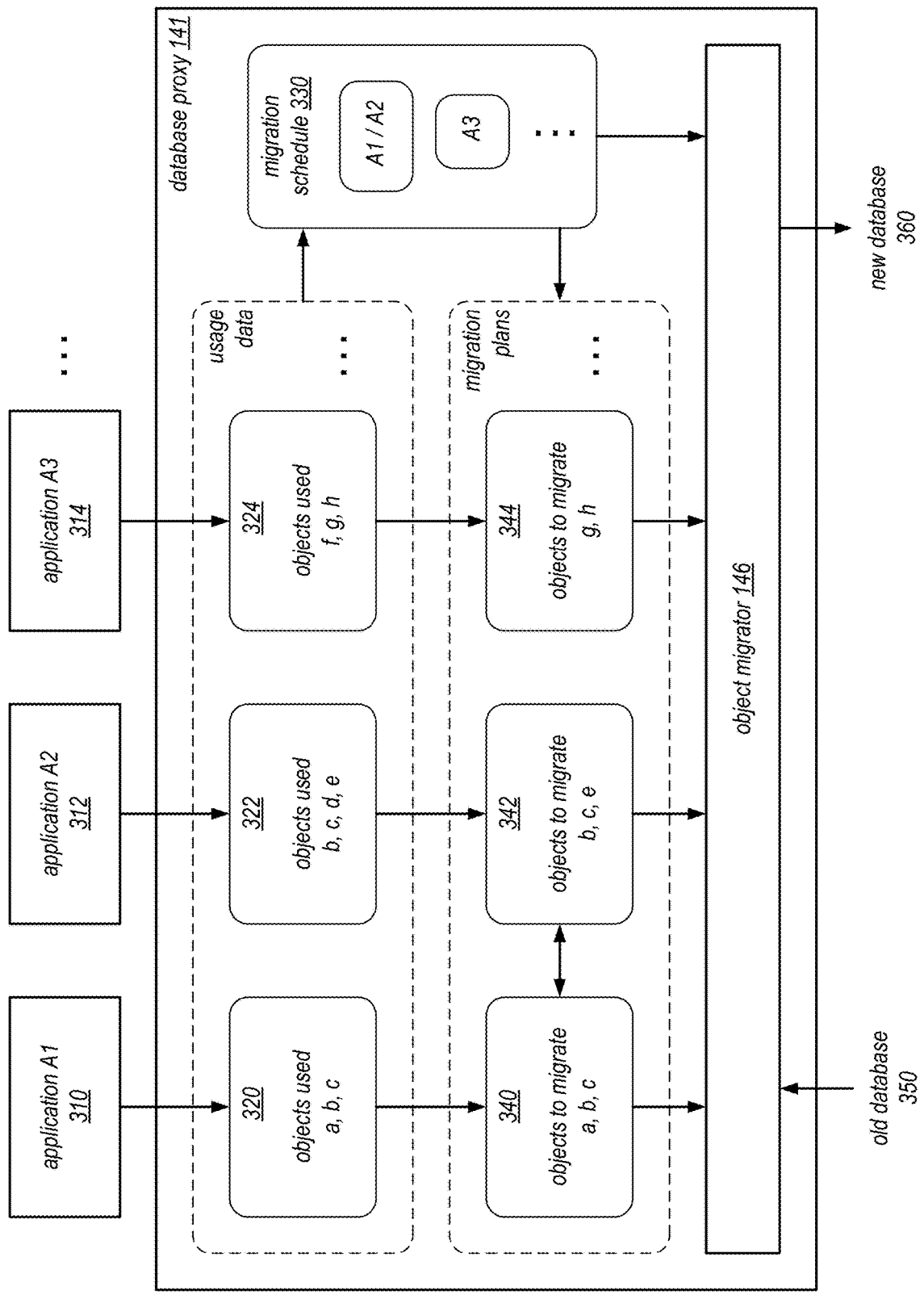
FIG. 3 illustrate an example database proxy that generates a migration schedule and migration plans to migrate multiple applications, according to some embodiments.

FIG. 3 illustrate an example database proxy that generates a migration schedule and migration plans to migrate multiple applications, according to some embodiments.

As shown, in some embodiments, the database proxy 141 may be used to manage the migration of many applications, such as applications A1 310, A2 312, and A3 314. In some embodiments, as shown, the applications may all share a single legacy database 350. In some embodiments, some applications may share common database objects in the legacy database 350.

In some embodiments, as shown, respective usage data 320, 322, and 324 may be collected for the applications being migrated. Such usage data may be collected using the techniques discussed in connection with FIG. 1. For example, in some embodiments, database requests from the applications may be observed, for example, at a proxy server. The requests may be aggregated for each application to determine the application's request types, counts, etc. In this example, as shown, applications A1 and A2 uses some common database objects from the old database: objects b and c. However, application A3 does not use any objects that are shared with applications A1 or A2.

In some embodiments, as shown, an application migration schedule 330 may be generated based on the usage data of the applications. For example, in some embodiments, the schedule may prioritize certain applications to be partially migrated first based on the application's usage profile. In some embodiments, depending on the migration manager's scheduling policy, an application with a higher usage level (e.g., in terms of request volume) may be migrated earlier. In some embodiments, an application with lower usage level may be migrated earlier, in order to reduce migration risk. In some embodiments, an application's rank in the schedule may be dependent on the number of database objects that it uses. In some embodiments, an overall portability index may be determined for each application to indicate the difficulty level of completely porting the application to the new database 360. In some embodiments, applications that are more easily ported may be scheduled to be migrated earlier. In some embodiments, migration of applications that use common database objects may be coordinated, so that the partial migration of one application does not cause error in another application. As shown, in this example, since applications A1 and A2 share common database objects, their respective migrations may be coordinated so that certain common objects are migrated for the two applications together.

In some embodiments, as shown, respective migration plans 340, 342, and 344 may be generated for each application. In some embodiments, these migration plans may be generated from the usage data using similar techniques as discussed in connection with FIG. 1. Additionally, in some embodiments, an individual migration plan for a particular application may also be dependent on the migration plans of other applications. For example, if certain database objects are already to be migrated because of another application (e.g., objects b and c for applications A1 and A2), request types in a later application that employ those objects may be automatically added for the migration the application in question. In some embodiments, the migration of such shared objects may be coordinated so that the migrations satisfy the requirements of all applications involved. In some embodiments, the aggregate usage of all of the applications may cause a particular database object to be migrated, even though the usage levels of the object for each application individually would not trigger a migrate. Accordingly, as may be understood, the migration plans of each individual application may be dependent on the migration plans of other applications.

As shown, the migration plans 340, 342, and 344 of each application may be provided to the object migrator 146, which may then perform the migrations according to the application migration schedule 330. In some embodiments, the migration process may be displayed and tracked via a GUI provided by the application migration manager. In some embodiments, the migration process may be paused, resumed, or edited via the GUI, for example, to add or remove applications from the schedule.

Figure 4:
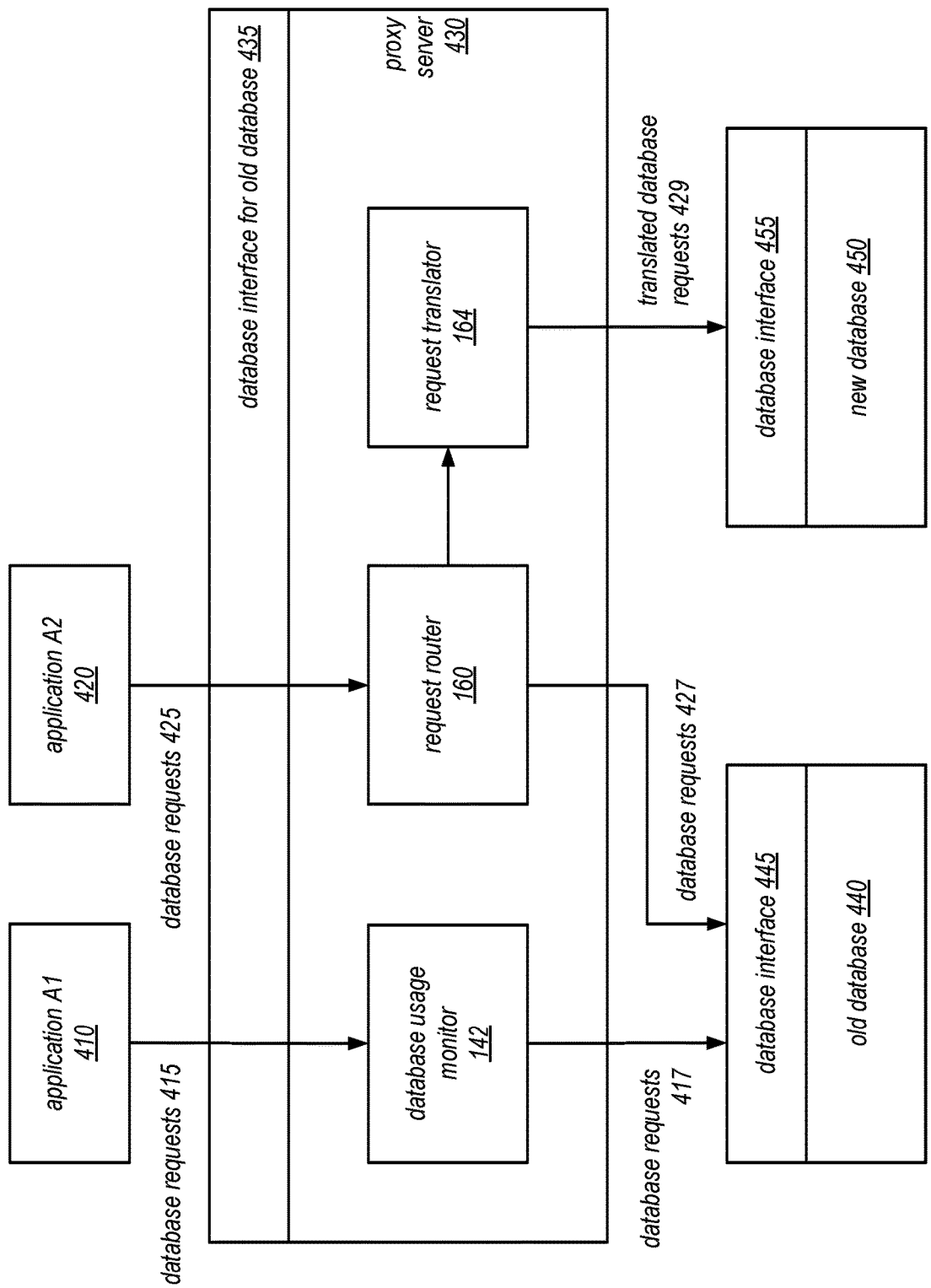
FIG. 4 illustrates an example proxy server that is used to implement a database proxy that migrates applications to different database systems without modifying the application, according to some embodiments.

FIG. 4 illustrates an example proxy server that is used to implement a database proxy that migrates applications to different database systems without modifying the application, according to some embodiments.

As shown, in some embodiments, a proxy server 430 may be used to implement some components of the database proxies discussed in FIG. 1, such as the database usage monitor 142, the request router 160, or the request translator 164. In some embodiments, the proxy server 430 may server a different primary function, such as a load balancer, request router, database cache subsystem, or the like. In such embodiments, the application migration management components may be added or piggybacked on the proxy server as a secondary function of these servers. In some embodiments, a service provider network may host a plurality of these proxy servers, such may be assigned to different applications (e.g., applications 410 and 412) and databases (e.g., databases 440 and 450). In some embodiments, different components (e.g., components 142, 160, and 164) may reside on different proxy servers for the same application. In some embodiments, the proxy servers may be implemented as virtual machine instances that are instantiated are provided to clients on an as-needed basis.

As shown, in some embodiments, the proxy server 430 may provide a database interface 435 which mimics the database interface of the old database 440. Thus, the database interface 435 provides the same access functions (e.g., read and write requests functions or protocols) as the database interface 445 of the old database. Accordingly, applications such as application A1 410 and A2 420 do not need to be modified at all. They may simply issue the same database requests 415 and 425 as they did prior to the migration. The proxy server 430 will present the appearance of the old database 440 to the applications. In some embodiments, the proxy server 430 will be left in place after the migration to act as a request translator for the applications 410 and 412 to the new database 450.

As shown, in some embodiments, the proxy server 430 may be used to implement the database usage monitor 142, which receives database requests from the applications and forwards them to the old database 440. During this process, all database request traffic may be observed by the proxy server. In some embodiments, the applications may simply establish a database connection with the proxy server as if it was the database.

As shown, in some embodiments, after partial migration has begun, the proxy server 430 may be used to implement the request router 160 and request translator 164. In some embodiments, the request router may determine which requests are to be forwarded to the old database 440 and which requests are to be forwarded to the new database 450, given the current state of the partial migration. In some embodiments, requests forwarded to the new database 450 are translated by the request router 164. The output of the request translator is a set of translated database requests 429, which is acceptable to the new database 450 via its database interface 455. For example, in some embodiments, the translation may entail adjust a database request for syntactical differences between the query language of the two databases. In some embodiments, a request may be changed drastically to account for the different database objects that have been implemented in the new database to mirror the data in the old database. In some embodiments, responses from the databases 440 and 450 may be returned to the application via the database interface 435 in the same way that requests responses are provided by the old database 440. Accordingly, the entire migration process may be completely transparent to the applications 410 and 420. In some embodiments, applications 410 and 420 may not have to be stopped during the course of migration process.

Figure 5:
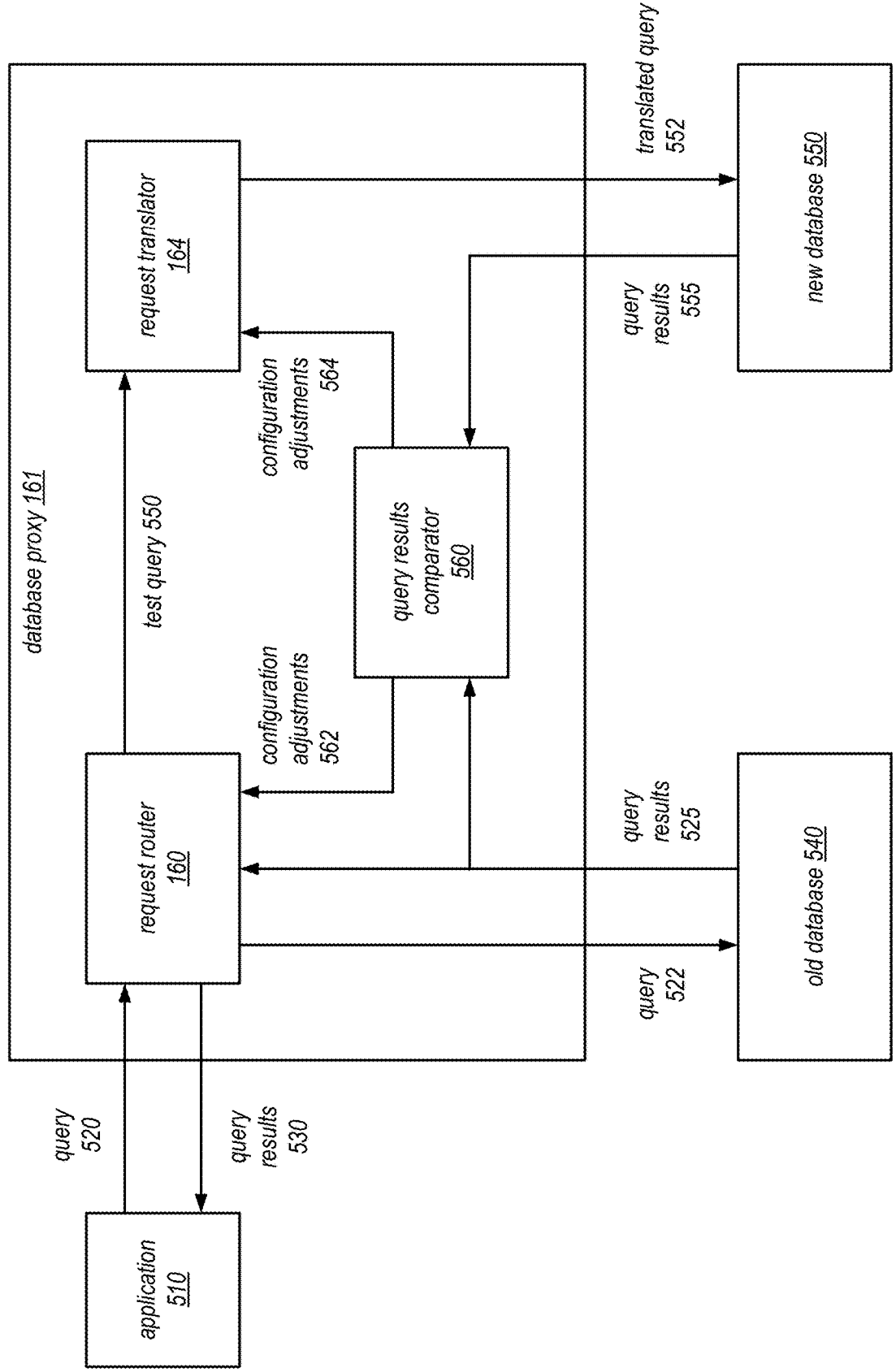
FIG. 5 illustrates an example query results comparator used to make configuration adjustments to a database proxy, according to some embodiments.

FIG. 5 illustrates an example query results comparator used to make configuration adjustments to a database proxy, according to some embodiments.

As shown, in some embodiments, the database proxy 161 may implement a query results comparator 560. The query results comparator 560 may be used to perform a test of the partially migrated system in the new database 550, and perform certain corrective actions. For example, in some embodiments, the query results comparator 560 may be configured to conditionally or periodically adjust the configuration of the request router 160 or the request translator 164, based on the comparison results.

As shown, in some embodiments, a partially migrated application 510 may send queries 520 to the database proxy 161. In some embodiments, the database proxy may send the query to both the old database 540 and the new database 550. As shown, the received query 520 is sent to the old database as query 522, and also to new database as a test query 550.

As discussed, the request translator 164 may be used to convert the test query 550 to a translated query for the new database.

In some embodiments, query results 525 and 555 from both the old database and the new database are provided to the query results comparator 560. In some embodiments, the query results comparator 560 may perform a comparison of the query results, to check that the query results from the two databases match. In some embodiments, the comparison check may only sample some subset of the query results in order to make the comparison process faster. If the query results differ, this may indicate that there was a migration problem that occurred with the partial migration (e.g., either a database object was not properly populated or the query was not properly translated), and that adjustments need to be made to the data in the new database 550. In some embodiments, the query results may be compared for particular query types, during a testing period. Query comparison results may be aggregated for the period, and used to decide at the end of the period whether the type of query is correctly handled by the new database 550. In some embodiments, while query results from the new database 550 are being observed or tested during the testing period, the actual query results 530 returned to the application are the query results 525 from the old database.

In some embodiments, in addition to determining whether the query results 555 of the new database correctly match the query results 525 from the old database, the query results comparator 560 may also perform configuration adjustments 562 and 564 to the request router 160 and request translator 164. In some embodiments, if the results from the new database sufficiently matches the results from the old database, the query results comparator 560 may configure the request router 160 to always direct queries to the new database 550, and return the query results 555 generated by the new database 550. In some embodiments, after the queries have been cut over to the new database, the request router 160 may still perform periodic checks of the query result against the old database 540. However, such periodic checking may be performed less frequently.

In some embodiments, if the results from the new database do not sufficiently match results from the old database, the query results comparator 160 may cause the request router 160 to direct all further queries of that type to the old database only. In some embodiments, the query result mismatches may be logged, so that a user can later analyze the cause of the mismatches, and migrate the data again to correct the problem.

In some embodiments, the query results comparator 560 may programmatically make certain adjustments 564 to the translation behavior of the request translator 164, based on the results of the comparison. In some embodiments, the query translations may be performed using a translation or transformation function. In some embodiments, parameters in the translation or transformation function may be adjusted by the query results comparator. For example, the query results comparator 560 may be configured to select one of two formatting for the query results 555 returned from the new database 550, based on the comparison results. In some embodiments, the comparison results may be used to train a machine learning model so that the database proxy gradually learns when query results will not match, and use those learnings to perform the translation adjustments predictively without the comparator 560.

Figure 6:
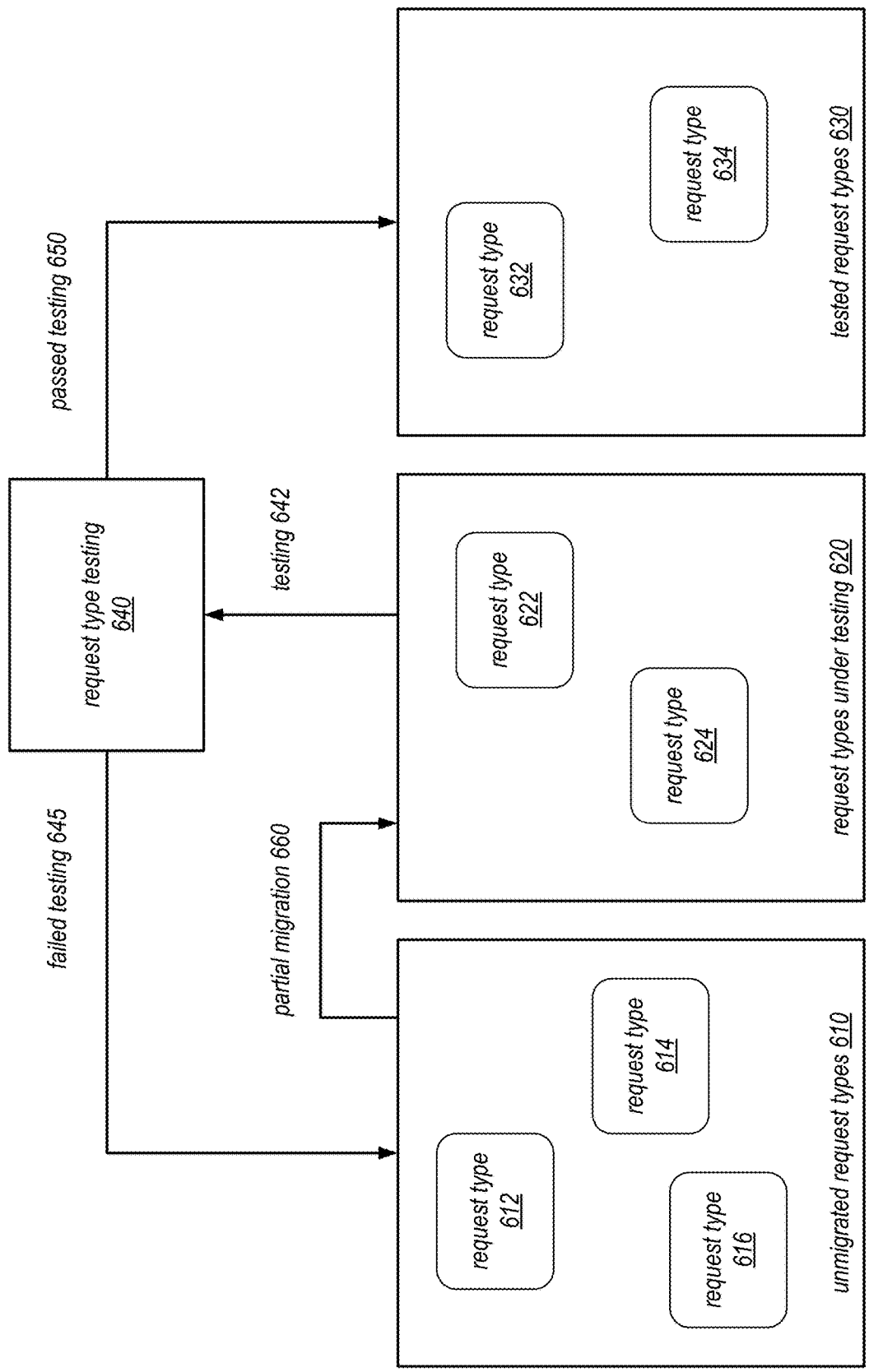
FIG. 6 illustrates an example testing process of different types of database requests from an application being migrated by an application migration management system, according to some embodiments.

FIG. 6 illustrates an example testing process of different types of database requests from an application being migrated by an application migration management system, according to some embodiments.

As shown, in some embodiments, the testing process of an application migration may be controlled by a request testing component 640, which may be implemented as part of the database proxy 161 or the application migration management service 140 of FIG. 1. In some embodiments, the request testing component 640 may be configurable via a testing policy, which may include user-configurable rules that specify when different request types of the application are to be transitioned from one testing stage to the next.

As shown, in some embodiments, the testing process may be performed of individual database request types observed for an application. As discussed, in some embodiments, the application may be migrated in stages, where different request types are migrated at different times in different partial migrations 660. In the depicted example, the testing process employs three stages. The first stage corresponds to a first group 610 of request types (612, 614, and 616), which are unmigrated request types that are still being directed to the old database. The second stage corresponds to a second group 620 of request types (622 and 624), which are request types that have been migrated but are currently under testing. The third stage corresponds to a third group 630 of request types (632 and 634), which are request types that have successfully passed testing process. For the request types in group 630, the requests may be forwarded only to the new database without any reliance on the old database. Depending on the embodiment, the testing process may include more or different testing stages or request type groups, whose transitions are dictated by the testing policy.

As shown, the request testing component 640 may perform testing 642 on the request types under testing. For example, in some embodiments, the queries to the new database may be tested by comparing their query results against results obtained from the old database, as discussed in connection with FIG. 5. In some embodiments, results of update requests may be tested by periodically comparing the data state of data objects in the two databases. For example, in some embodiments, the request testing module may compare row counts or a hash values computed from the contents of the two databases. The results of such testing may indicate whether the request types under testing are behaving correctly.

If a request type passes the testing stage 650, it may be promoted so that the new database will be used to permanently handle requests of that type. In some embodiments, additional periodic testing may be performed for a period of time, before resources in the old database are permanently retired. If the request type fails testing 645, it may be demoted back as an unmigrated request type. In some embodiments, the testing results may be logged and recorded by the application migration management system, so that a later attempt to migrate the request type can be designed to correct the issues discovered during the testing.

Figure 7:
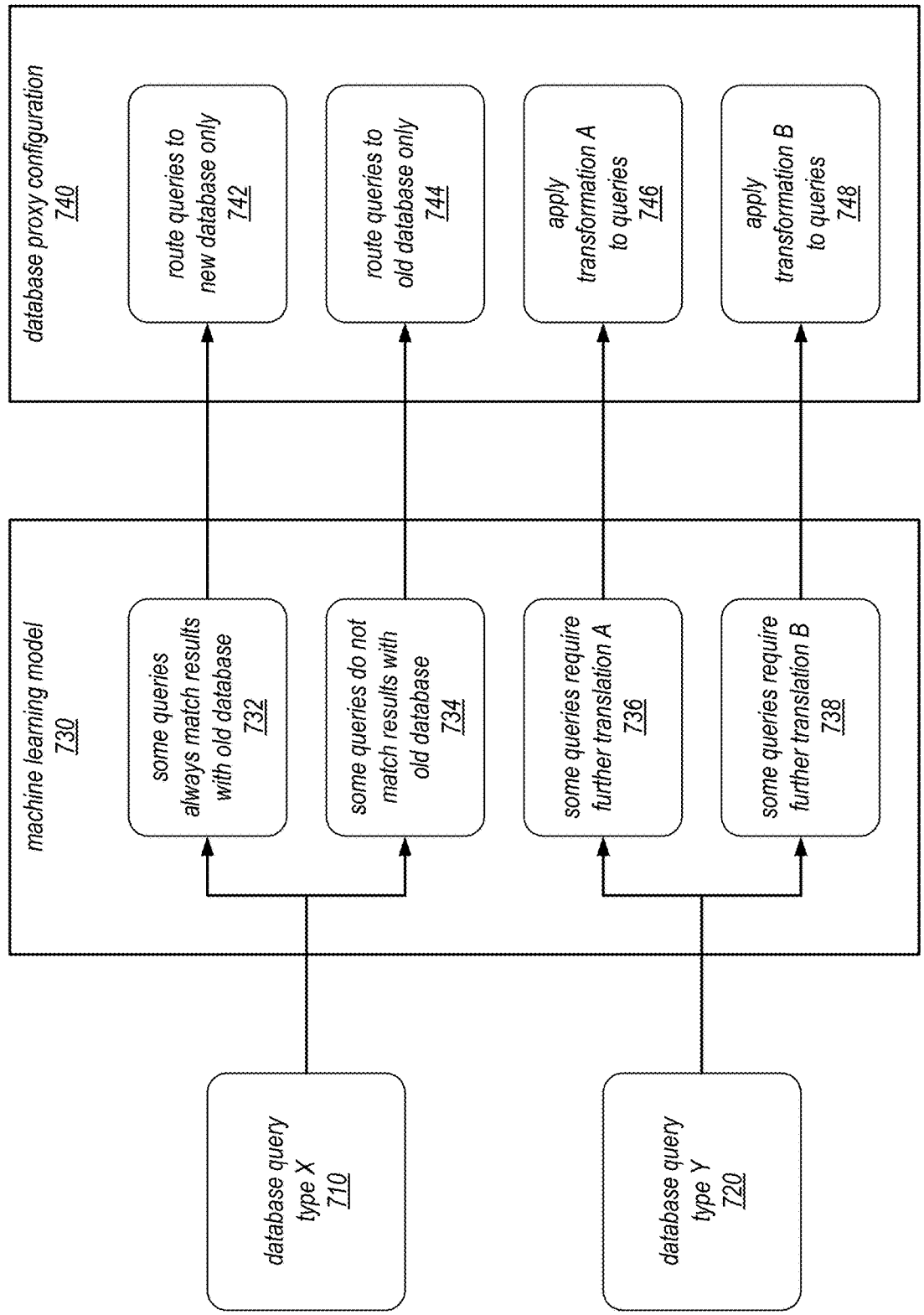
FIG. 7 illustrates an example machine learning model that is used to programmatically learn to query handling behaviors for queries issued by an application, according to some embodiments.

FIG. 7 illustrates an example machine learning model that is used to programmatically learn to query handling behaviors for queries issued by an application, according to some embodiments.

As shown, in some embodiments, the database proxy may implement a machine learning process, which trains a machine learning model 730. In some embodiments, the machine learning model 730 may observer database requests from the application, and gradually learn, based on the characteristics of the requests, what actions to take for that request.

As shown, in some embodiments, the machine learning model may be used to observe a particular type of database query, for example database query type X 710. In some embodiments, database query type X may be a particular type of select statement issued by the application. In some embodiments, the machine learning model may learn, via a machine learning process and through repeated observation of queries of type 170, that some queries 732 to the new database with particular filtering conditions (or other query characteristics) always return correct results (for example based on a match of query results from the old database). On the other hand, the machine learning model may learn that some queries 734 with certain characteristics to the new database often returned incorrect results. For example, queries directed to data in one region may be always correct, while queries directed to data in another region may be frequently incorrect. Over time, the machine learning model may become extremely accurate in predicting whether queries will or will not return correct results.

After the model 730 is sufficiently trained, in some embodiments, the database proxy may apply configuration adjustments 740 to the database proxy based on the predictions of the model. For example, in some embodiments, queries that are predicted to return correct results 732 may be reconfigured to be routed 742 to the new database only. On the other hand, queries that are predicted to return incorrect results 734 may be reconfigured to be routed 744 to the old database only. In some embodiments, the incorrect queries may be examined more closely to determine the cause of these errors. In some embodiments, the application migration management system may simply leave the machine learning model 730 in place to continue servicing queries of type X 710 using both databases.

As shown, for another example database query type Y 720, the machine learning model 730 may learn that certain queries 736 always require a particular translation A (for example via a matching with results from the old database), while certain other queries 738 always require another type of translation B. In some embodiments, the transformations may be determined by human users from observing sample query result mismatches from the two databases. In some embodiments, the migration system may then apply these user-supplied transformations by trial-and-error, and determine which transformations should be applied to which queries (or query results) in order to produce matching results with the old database. In some embodiments, after the model 730 learns to apply the transformations to always arrive at the correct results, the model may be made a permanent part of the migration system. In some embodiments, the transformation selections of the model may become part of the configuration change of the migration system. For example, in some embodiments, queries that are determined to require translation A 736 may be configured 746 to receive transformation A, and queries that are determined to require translation B 738 may be configured 748 to receive transformation B. Advantageously, this machine learning process allows the migration system to mimic the behavior of the old database by observing the interactions between the application and the old database, and without analyzing the code of the application or the old database.

Figure 8A:
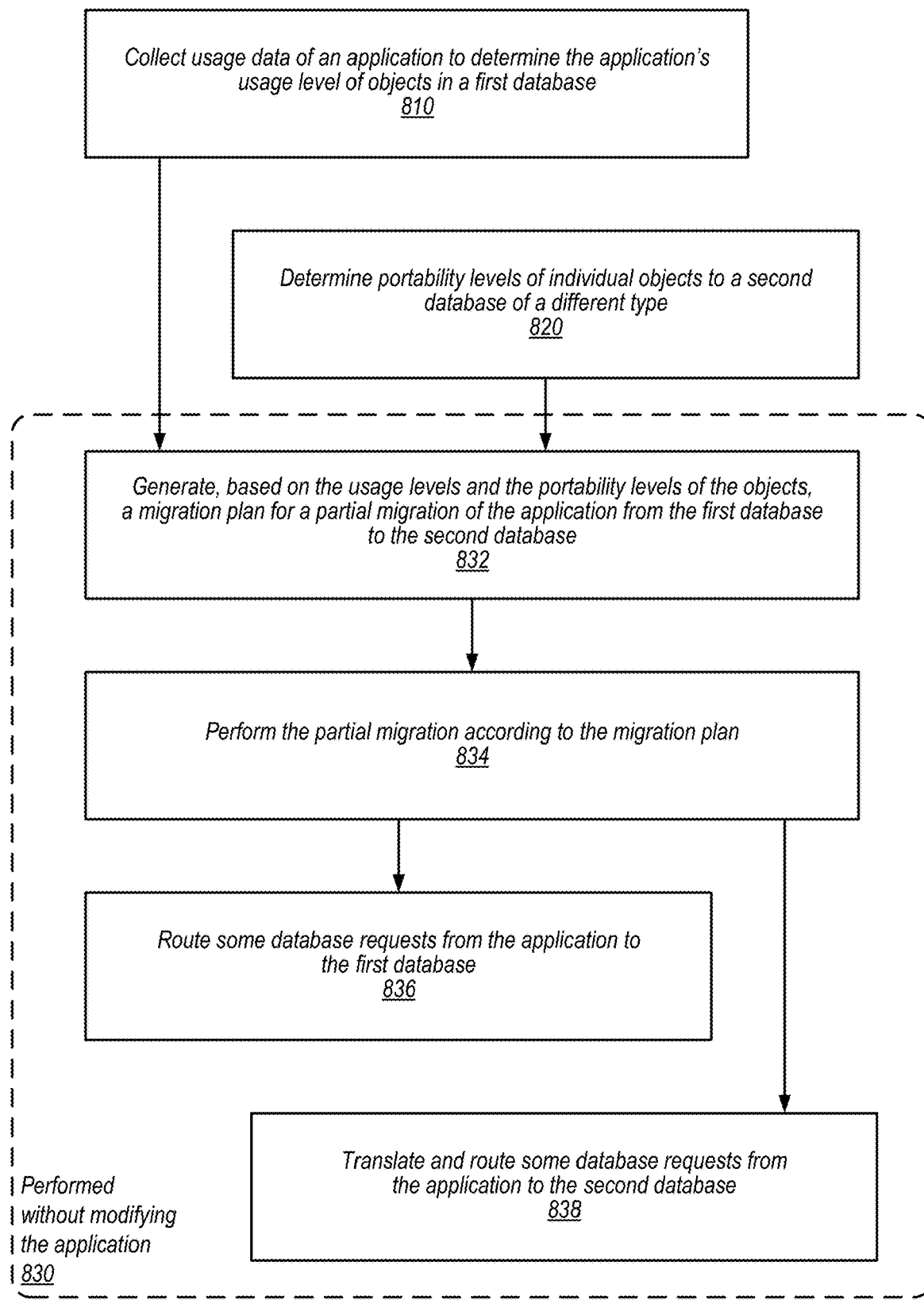
FIGS. 8A and 8B are flowcharts illustrating processes of performing partial migration according to a migration plan generated by an application migration management system, according to some embodiments.
Figure 8B:
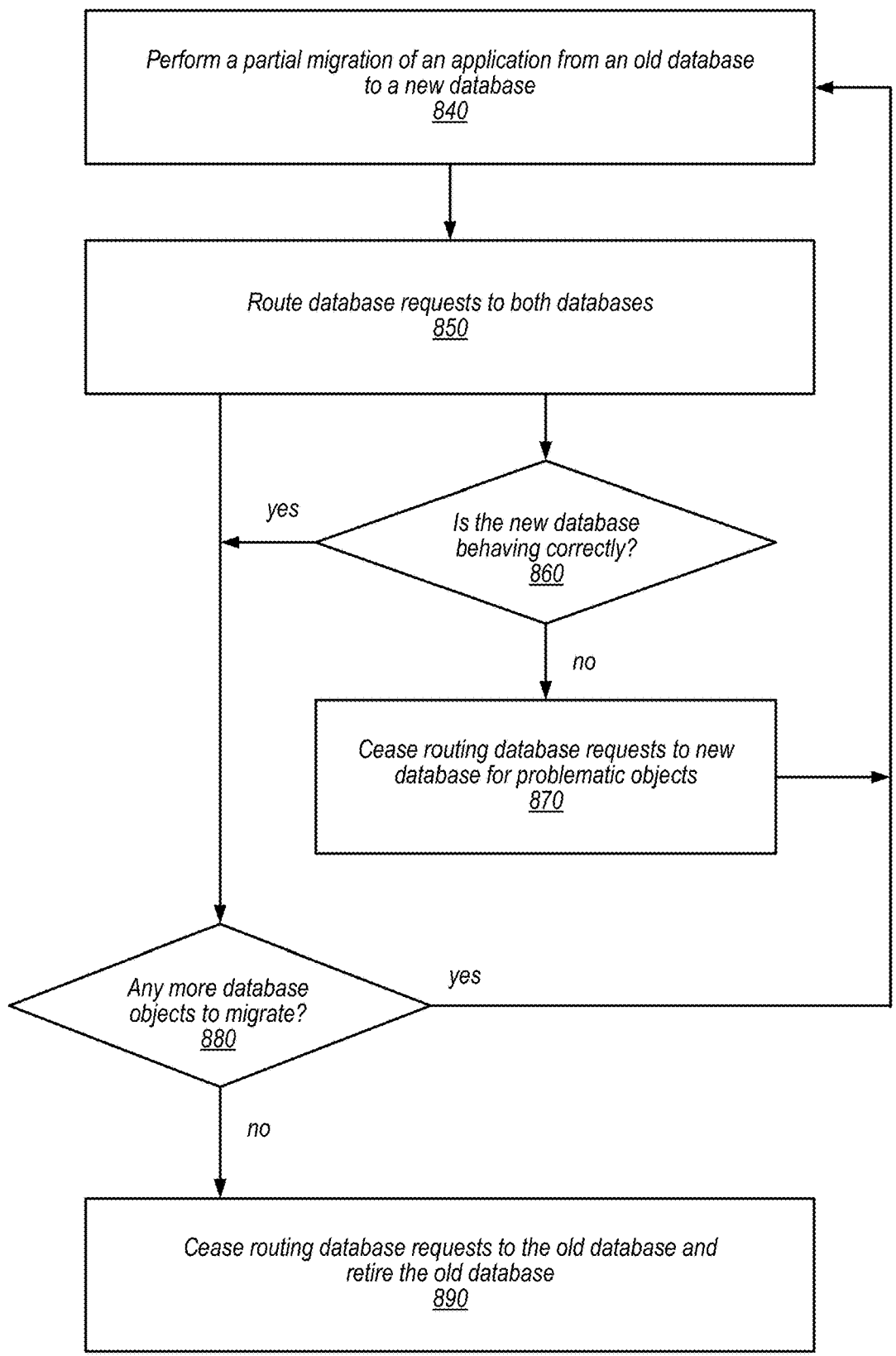

FIGS. 8A and 8B are flowcharts illustrating processes of performing partial migration according to a migration plan generated by an application migration management system, according to some embodiments. The process depicted in the FIG. 8A may be performed, for example, by the database proxy 141 of FIG. 1.

The process begins at operation 810, where usage data of an application is collected and used to determine the application's usage level of objects in a first database. The first database may be for example a legacy database that is used by the application, which will be replaced, at least in part by a new database. In some embodiments, the usage data may be collected by a proxy server, which intercepts and forwards database requests from the application to the database. In some embodiments, the usage data may indicate the different types of requests issued by the application and also the volume of the requests for each request type. In some embodiments, the usage data may also include the size of the objects used by the application. In some embodiments, the usage data may also include information gathered from one or more transaction logs in the database.

At operation 820, for individual database objects used by the application, a portability level is determined to port the object to a second database of a different type. For example, the second database may be a new database that will be used to partially replace the legacy database. In some embodiments, the portability level may indicate how easily it is to implement a destination object to replicate the functionality of a given object in the old database. In some embodiments, the portability level may indicate whether a given object can be implemented using automatically generated code. In some embodiments, the portability level may indicate that only a subset of attributes of a given table can be automatically migrated. In some embodiments, the indicated portability level may be accompanied by a recommendation as to how to migrate the other columns of table. In some embodiments, the portability level of the object may be determined based on an analysis of the schema of the object and a set of object migration rules provided to application migration manager.

As shown, operations 832, 834, 836, and 838 are performed without modifying the application being migrated. As discussed, in some embodiments, the entire migration process is carried out using a proxy server that exposes the database interface of the old database. Accordingly, the migration process does not require any changes to the application. In some embodiments, the migration process may treat the application as a black box, and no code analysis need to be performed on the application for the migration. In some embodiments, the application does not need to be stopped during the migration.

At operation 832, a migration plan is generated for the application based on the usage levels and portability levels of the objects. The migration plan may specify a process for a partial migration of the application from the first database to the second database. In some embodiments, the migration plan may be capable of specifying a full migration of the application under certain circumstances. In some embodiments, the migration plan may be generated according to a set of rules indicated in a migration policy. For example, in some embodiments, the database proxy may migrate objects in groups according to how they are used by the application's database requests. In some embodiments, heavily used objects or request types may be given priority to be migrated. In some embodiments, lesser used objects or request types may be given priority. In some embodiments, the portability level of an object may impact whether it is included in the partial migration.

The migration plan may also specify certain configuration settings on how individual database objects are to be migrated. In some embodiments, the migration plan may include a recommendation to manually migrate a particular object. In some embodiments, the migration plan may indicate, for a particular object, that only certain columns or attributes are to be migrated. In some embodiments, the migration plan may indicate, for a particular object that only certain rows or data items are to be migrated. In some embodiments, the migration plan may indicate, for a particular object, that the object will be maintained in both databases and that certain types of requests will be serviced using the object in the old database and certain other types of requests will be serviced using the object in the new database. In some embodiments, the migration plan may include or be used to generate database code to create and/or populate the destination object created in the new database. In some embodiments, the code may be viewable and editable by a user, for example, via a graphical user interface presented by the application migration manager. In some embodiments, many different aspects of the migration plan, including those objects selected for migration, may be adjusted manually by a user.

At operation 834, the partial migration is performed according to the migration plan. In some embodiments, the database proxy may implement one or more components to perform the partial migration, at least in part. In some embodiments, the migration may be performed on an object-by-object basis, for example, via an object migrator component 146, as described in connection with FIG. 1. In some embodiments, the database proxy may allow users to upload custom migration code, so that portions of the partial migration may be run according to the custom code. In some embodiments, the migration process may be scheduled to occur at a specified time, and in specified migration stages. In some embodiments, the progress of the migration may be tracked, for example, via a graphical user interface of the application migration manager.

At operations 836, some database requests from the application are routed to the first database. In some embodiments, the application may continue to operate without modification over the two databases. In some embodiments, after the partial migration, the database proxy may remain in place to act as a request router for the application to the first database. In some embodiments, the request router may be the request router 160 of FIG. 1. In some embodiments, a single database request may be routed to both databases for testing or other purposes.

At operation 838, some database requests from the application are translated and then routed to the second database. In some embodiments, after the partial migration, the database proxy may remain in place to act as a request router and request translator the application to the second database. In some embodiments, the request router may be the request router 160 of FIG. 1, and the request translator may be request translator 164 of FIG. 1. In some embodiments, a single database request may be routed to both databases for testing or other purposes.

FIG. 8B depicts a process where partial migrations are repeatedly performed on an application until the application is completely migrated to the new database.

At operation 840, a partial migration is performed on an application to migrate it from an old database to a new database. The operation may be performed by a database proxy such as database proxy 141 of FIG. 1 or an application migration manager 140, as discussed in FIG. 1. In some embodiments, this migration may be performed in similar fashion as discussed in connection with operation 834 of FIG. 8A. In some embodiments, the migration may be performed according to a migration plan, as discussed in connection with operation 832 of FIG. 8A.

At operation 850, database requests are routed to both databases. In some embodiments, this operation may be performed by a database proxy such as database proxy 141 or 161 in FIG. 1. In some embodiments, the database proxy may provide a database interface that is the same as the database interface of the old database. In some embodiments, the database proxy may also perform a translation of the database request for the new database. In some embodiments, this operation may be performed in similar fashion as discussed for operations 836 and 838 of FIG. 8A.

At operation 860, a determination is made whether the new database is behaving correctly. For example, in some embodiments, the query results or database state of the new database and the old database may be compared. In some embodiments, the new database may be deemed to be not behaving correctly if mismatches are detected. In some embodiments, this operation may be performed during a testing or observation period of the new database. In some embodiments, this operation may be performed using the query results comparator 560 of FIG. 5 or the request type testing module 640 of FIG. 6.

At operation 870, if the new database is not behaving correctly, database requests for problematic objects in the new database will cease to be routed to the new database. For example, in some embodiments, if a potential problem is detected for a particular table in the new database, queries against the table may be stopped. Such queries may be reverted back to the version of the table in the old database. In some embodiments, the errors may be captured so that a user may later analyze the errors and attempt to migrate the table again.

At operation 880, if the new database is behaving correctly, a determination is made whether additional database object remain to be migrated. In some embodiments, the application migration management system or the database proxy may maintain metadata as to the migration state of the application. Such information may be used to determine if more objects remain to be migrated.

If there are still more objects to migrate, the process proceeds back to operation 840. In some embodiments, this process may include an additional period of observation for usage data, and the generation of another partial migration plan. In some embodiments, the application migration management system will continue to schedule objects for partial migration according to a scheduling policy. In some embodiments, multiple partial migrations may be performed for the application at the same time (e.g., multiple migration plans are progressing in parallel). In some embodiments, additional partial migrations may involve more and more user intervention. However, the application will continue to operate throughout the migration process without change. In some embodiments, the application may never be fully migrated, but continue to operate permanently on both databases.

If there are no more objects to migration, the process proceeds to operation 890, where the routing of database requests to the old database is ceased, and the old database is retired. In some embodiments, objects in the old database may be retired in piecemeal, for example, after it is determined that their counterpart objects in the new database are behaving correctly, in operation 860. In this manner, the resources needed for the old database can be gradually reduced. Moreover, by migrating the application in this gradual manner, risks of the migration are substantially reduced.

Figure 9:
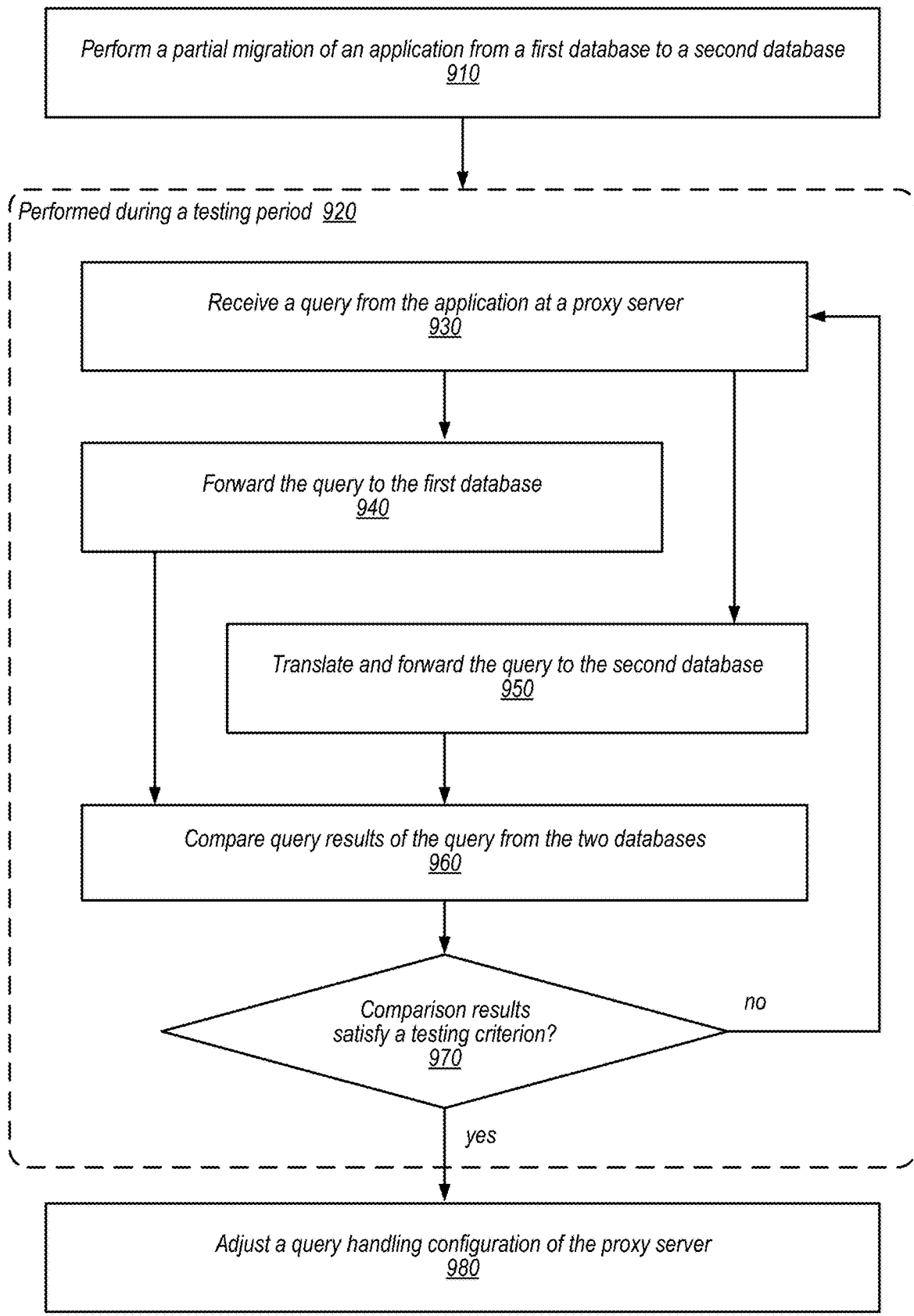
FIG. 9 is a flowchart illustrating a process of testing queries received by an application migration management system and responsively adjusting the query handling configuration of the system, according to some embodiments.

FIG. 9 is a flowchart illustrating a process of testing queries received by an application migration management system and responsively adjusting the query handling configuration of the system, according to some embodiments. The process depicted in the figure may be performed, for example, by the database proxy 161 of FIG. 1, or the query results comparator 560 of FIG. 5.

At operation 910, a partial migration of an application is performed from a first database to a second database. In some embodiments, this partial migration may migrate some database objects used by the application from the first database to the second database. Operation 910 may be performed in a similar manner as operation 834, as discussed in connection with FIG. 8A.

As shown, operations 930, 940, 950, 960, and 970 may be performed during a testing period 920. In some embodiments, different types of queries or other database requests may undergo a testing period where their effect or results from the new database are compared against effects or result from the old database. In some embodiments, the results of this testing may influence how the queries or other data requests are handled.

At operation 930, a query is received from the application at a proxy server. As discussed, in some embodiments, the application migration management system may be implemented using a proxy server that will remain in place as a request router and translator after the migration. In some embodiments, the proxy server may present a database interface that is the same as the database interface of the old database, and receive application queries via this database interface. In some embodiments, the proxy server may be the proxy server 430, as discussed in connection with FIG. 4.

At operation 940, the query is forwarded to the first database. In some embodiments, during this testing period, the old database is used as the actual database for the query. Thus, query results from the old database are returned to the application.

At operation 950, the query is translated and forwarded to the second database. In some embodiments, during the testing period, the proxy server also generates a second query for the new database, in order to test the query handling behavior of the new database. In some embodiments, the second query is translated for the database interface of the new database, using a request translator.

At operation 960, the query results obtained from the two databases are compared. In some embodiments, the comparison may be a full comparison of the entire result sets return from the two databases. In some embodiments, the comparison may be made using one or more probabilistic data structures, such as one or more hash codes, checksums, data sizes, etc., of the results sets. In some embodiments, only a sample of the result sets from the two databases may be compared. In some embodiments, the results of the comparison may be incorporated into an aggregate result for the query type. In some embodiments, individual mismatches that are identified may also be logged.

At operation 970, a determination is made whether the comparison results for the query type satisfies a testing criterion. In some embodiments, the testing criterion may be check for every query. In some embodiments, the testing criterion may be checked for a certain number of queries, or over a fixed time period. In some embodiments, the test criterion may indicate a success condition, where a query type is accepted to be behaving correctly on the new database if the query results match results from the old database to a sufficient degree. In some embodiments, the test criteria may indicate a failure condition, where a query type is deemed to be behaving incorrectly on the new database if the query results do not match results from the old database to a sufficient degree. In some embodiments, the testing criterion may also conditions for particular groups of queries within a particular query type. For example, in some embodiments, the testing criterion may be met when queries with a particular filtering condition fails to sufficiently match results from the old database. The meeting of these testing criterion may then be used to trigger configuration changes, as shown.

At operation 980, the query handling configuration of the proxy server is adjusted. In some embodiments, the adjustment may be triggered by the meeting of one or more testing criteria, according to a configuration adjustment policy. For example, in some embodiments, a query type that passes the testing performed in the testing period 920 may be promoted to be permanently handled by the new database. In some embodiments, the query type may still be checked occasionally against the old database. In some embodiments, after sufficient testing, the resources in the old database supporting the query type may be retired. In some embodiments, if the query type fails the testing performed in the testing period 920, the query type may be demoted back to an unmigrated state. In some embodiments, queries in an unmigrated state may be serviced using the old database alone. In some embodiments, the problems detected during the testing period may be logged so that they may be studied to implement another partial migration the query type.

In some embodiments, the configuration setting adjustment may involve changing the configuration to permanently apply a transformation to queries having one or more characteristics. In some embodiments, the proxy server may make these adjustments via a rule-based decision-making system. In some embodiments, the proxy server may learn, via a machine learning process, that queries having particular characteristics require a transformation to be applied to their query results. In some embodiments, the proxy server may learn that queries meeting certain criteria will return incorrect results from the new database, and adjust the routing configuration to stop forwarding such queries to the new database. In some embodiments, when these learnings become sufficiently accurate, the machine learning model that is trained to recognize these characteristics may be made a permanent part of the query handling configuration of the proxy server. Depending on the predictions generated from the model, different transformations may be applied to the query or query results. In some embodiments, the proxy server can use the machine learning model to transform queries or query results to mimic the behavior of the old database without sending the queries to the old database.

Figure 10:
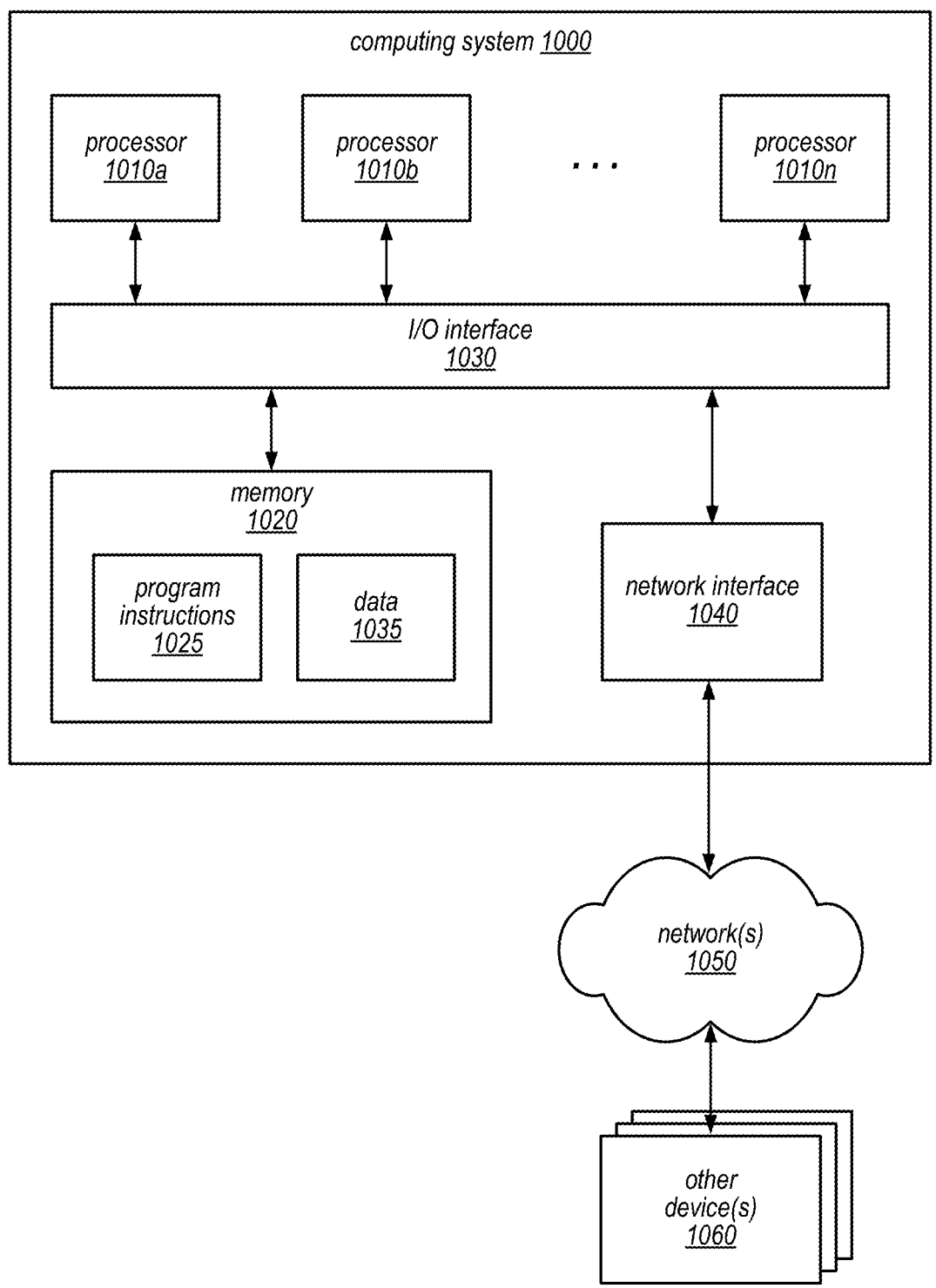
FIG. 10 is a block diagram illustrating an example computer system that can be used to implement one or more portions of an application migration management system that migrates applications to different database systems without modifying the application, according to some embodiments.

FIG. 10 is a block diagram illustrating an example computer system that can be used to implement one or more portions of an application migration management system that migrates applications to different database systems without modifying the application, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computing devices configured to:
collect, via a proxy server of a first database, usage data of an application's use of the first database, including usage levels of individual objects stored in the first database by the application;
generate, based at least in part on the usage data, a migration plan for a partial migration of the application from the first database to a second database of a different type, wherein the migration plan indicates a subset of the objects to migrate from the first database to the second database and a subset of the objects to remain in the first database, wherein the subset of objects to migrate is selected based at least in part on the usage levels of the individual objects by the application;
perform the partial migration according to the migration plan; and
perform, via the proxy server and subsequent to the partial migration:
route database requests from the application directed to the subset of remaining objects to the first database; and
route other database requests from the application directed to the subset of migrated objects to the second database, wherein the other database requests are translated from a format or protocol of the first database to a different format or protocol of the second database according to a translation function generated as part of the partial migration;
wherein the partial migration and the routing of database requests are performed without modifying the application.

2. The system of claim 1, wherein to generate the migration plan, the one or more computing devices is configured to:
select the subset of objects to migrate to the second database based at least in part on a portability indicator of the individual objects to the second database.

3. The system of claim 1, wherein the one or more computing devices is configured to generate the migration plan to indicate that a particular object used by the application is to be stored in both the first and the second database, and that one type of database request for the particular object is to be routed to the first database and another type of database request for the particular object is to be routed to the second database.

4. The system of claim 1, wherein the proxy server is configured to, subsequent to the partial migration:
route a query from the application to the first database;
route a translated version of the query to the second databases;
compare respective query results of the query from the two databases; and
adjust a query handling configuration of the proxy server based at least in part on the comparison of query results.

5. The system of claim 4, wherein the proxy server is configured to perform the adjustment of the querying handing configuration as part of a machine learning process that learns to make different configuration adjustments based at least in part on one or more characteristics of queries.

6. A computer-implemented method, comprising:
performing, by a proxy server of a first database:
collecting usage data of an application's use of a first database, including usage levels of individual objects stored in the first database by the application;
generating, based at least in part on the usage data, a migration plan for a partial migration of the application from the first database to a second database of a different type, wherein the migration plan indicates a subset of the objects to migrate from the first database to the second database and a subset of the objects to remain in the first database, wherein the subset of objects to migrate is selected based at least in part on the usage levels of the individual objects by the application;
performing the partial migration according to the migration plan; and
subsequent to the partial migration:
routing at least some database requests from the application directed to the subset of remaining objects to the first database; and routing other database requests from the application directed to the subset of migrated objects to the second database, wherein the other database requests are translated from a format or protocol of the first database to a different format or protocol of the second database according to a translation function generated as part of the partial migration;

wherein the partial migration and the translating and routing of database requests are performed without modifying the application.

7. The method of claim 6, further comprising the proxy server:
collecting usage data for a plurality of applications sharing the first database; and
generating respective migration plans for individual ones of the applications, wherein a particular migration plan for one of the applications is generated based at least in part on another migration plan for another one of the applications.

8. The method of claim 6, wherein:
the first database is executing outside a service provider network;
the second database is executing in the service provider network; and
the partial migration is performed as one stage of a multi-stage migration of the application from the first database to the second database.

9. The method of claim 6, wherein:
the collecting of the usage data is based at least in part on metadata of objects in the first database or one or more transaction logs of the first database.

10. The method of claim 6, wherein the generating of the migration plan comprises:
selecting the subset of objects to migrate to the second database based at least in part on a portability indicator of the individual objects to the second database.

11. The method of claim 6, wherein the generating of the migration plan comprises:
indicating in the migration plan computer-executable instructions to implement a first object in the second database; and
indicating in the migration plan that a second object used by the application is not fully supported by the second database and a recommendation to manually migrate the second object to the second database.

12. The method of claim 6, wherein the generating of the migration plan comprises:
indicating in the migration plan that a particular object used by the application is to be stored in both the first and the second database, and that one type of database request for the particular object is to be routed to the first database and another type of database request for the particular object is to be routed to the second database.

13. The method of claim 6, wherein the translating of database requests comprises receiving an input database request for the first database specified in a structured query language (SQL) and generating an output database request for the second database that is not specified in SQL.

14. The method of claim 6, further comprising:
performing, by the proxy server and subsequent to the partial migration:
routing a query from the application to the first database;
routing a translated version of the query to the second database;
comparing respective query results of the query from the two databases; and
adjusting a query handling configuration of the proxy server based at least in part on the comparison of query results.

15. The method of claim 14, wherein adjusting the query handling configuration comprises changing the translation function.

16. The method of claim 14, wherein the adjusting of the query handling configuration is performed as part of a machine learning process that learns to make different configuration adjustments based at least in part on one or more characteristics of queries.

17. A non-transitory computer-accessible storage medium storing program instructions that when executed on one or more processors of a proxy server of a first database, cause the proxy server to:
collect usage data of an application's use of a first database, including usage levels of individual objects stored in the first database by the application;
obtain a migration plan for a partial migration of the application from the first database to a second database of a different type, wherein the migration plan is generated based at least in part on the usage data and indicates a subset of the objects to migrate from the first database to the second database and a subset of the objects to remain in the first database, wherein the subset of objects to migrate is selected based at least in part on the usage levels of the individual objects by the application;
perform the partial migration according to the migration plan; and
subsequent to the partial migration:
route database requests from the application directed to the subset of remaining objects to the first database; and
route other database requests from the application directed to the subset of migrated objects to the second database, wherein the other database requests are translated from a format or protocol of the first database to a different format or protocol of the second database according to a translation function generated as part of the partial migration;
wherein the partial migration and the translating and routing of database requests are performed without modifying the application.

18. The non-transitory computer-accessible storage medium of claim 17, wherein the program instructions when executed on the one or more processors cause the proxy server to:
obtain another migration plan for a complete migration of the application from the first database to the second database;
perform the complete migration according to the other migration plan; and
cease routing database requests from the application to the first database.

19. The non-transitory computer-accessible storage medium of claim 17, wherein to translate the database requests, the program instructions when executed on the one or more processors cause the proxy server to:
receive an input database request for the first database specified in a structured query language (SQL); and
generate an output database request for the second database that is not specified in SQL.

20. The non-transitory computer-accessible storage medium of claim 17, wherein to translate the database requests, the program instructions when executed on the one or more processors cause the proxy server to:
receive an input database request for the first database that is not specified in a structured query language (SQL); and
generate an output database request for the second database that is specified in SQL.

21. The non-transitory computer-accessible storage medium of claim 17, wherein the program instructions when executed on the one or more processors cause the proxy server to:
route a query from the application to the first database;
route a translated version of the query to the second database;
compare respective query results of the query from the two databases; and
adjust a query handling configuration of the proxy server based at least in part on the comparison of query results.

22. The non-transitory computer-accessible storage medium of claim wherein to adjust the query handling configuration of the proxy server, the program instructions when executed on the one or more processors cause the proxy server to cease forwarding queries meeting one or more criteria to the first or the second database.

23. The non-transitory computer-accessible storage medium of claim 20, wherein the program instructions when executed on the one or more processors cause the proxy server to perform the adjustment of the querying handing configuration as part of a machine learning process that learns to make different configuration adjustments based at least in part on one or more characteristics of queries.

\* \* \* \* \*